United States Patent
Judd

(10) Patent No.: US 9,505,363 B2
(45) Date of Patent: Nov. 29, 2016

(54) BUMPER GUARD

(71) Applicant: Terrence K. Judd, Jamaica Estates, NY (US)

(72) Inventor: Terrence K. Judd, Jamaica Estates, NY (US)

( * ) Notice: Subject to any disclaimer, the term of this patent is extended or adjusted under 35 U.S.C. 154(b) by 0 days.

(21) Appl. No.: 14/663,993

(22) Filed: Mar. 20, 2015

(65) Prior Publication Data

US 2016/0272138 A1 Sep. 22, 2016

(51) Int. Cl.
*B60R 19/44* (2006.01)
*B60R 19/03* (2006.01)

(52) U.S. Cl.
CPC ............ *B60R 19/44* (2013.01); *B60R 19/03* (2013.01)

(58) Field of Classification Search
CPC ............................... B60R 19/44; B60J 11/06
USPC ............... 296/136.02; 280/770; 293/142
See application file for complete search history.

(56) References Cited

U.S. PATENT DOCUMENTS

| | | | | |
|---|---|---|---|---|
| 4,408,824 A * | 10/1983 | Weidler | ............ | H01R 4/2462 439/398 |
| 4,493,502 A * | 1/1985 | Campbell, Jr. | ......... | B60R 13/04 267/140 |
| 4,708,380 A * | 11/1987 | Cruz | ............ | B60R 13/04 280/770 |
| 4,810,013 A * | 3/1989 | Spears | ............ | B60R 13/04 280/770 |
| 5,618,073 A | 4/1997 | Criscione | | |
| 6,186,564 B1 * | 2/2001 | Ashcroft | ............ | B60R 13/04 280/770 |
| 7,073,830 B1 * | 7/2006 | Chen | ............ | B60J 11/06 293/109 |
| 7,740,294 B2 * | 6/2010 | Malina | ............ | B60R 19/44 293/128 |
| 7,857,366 B2 * | 12/2010 | Michael | ............ | B60R 11/00 293/126 |
| 2003/0034660 A1 * | 2/2003 | Kelly | ............ | B60R 19/44 293/142 |
| 2003/0205408 A1 * | 11/2003 | Lee | ............ | E21B 25/06 175/20 |
| 2010/0276951 A1 | 11/2010 | Malina et al. | | |

OTHER PUBLICATIONS

Bumper Guard and Protection illustrations Feb. 21, 2012.

* cited by examiner

*Primary Examiner* — Glenn Dayoan
*Assistant Examiner* — Sunsurraye Westbrook
(74) *Attorney, Agent, or Firm* — DLA Piper LLP (US)

(57) ABSTRACT

A bumper guard assembly for protecting a vehicle bumper from damage resulting from a low speed collision is provided. The bumper guard assembly includes a flexible elongated body, a rigid terminal brace positioned on each opposing end of the elongated body, and a fender strap mounted on each terminal brace for securing the bumper guard to a fender of the vehicle.

18 Claims, 6 Drawing Sheets

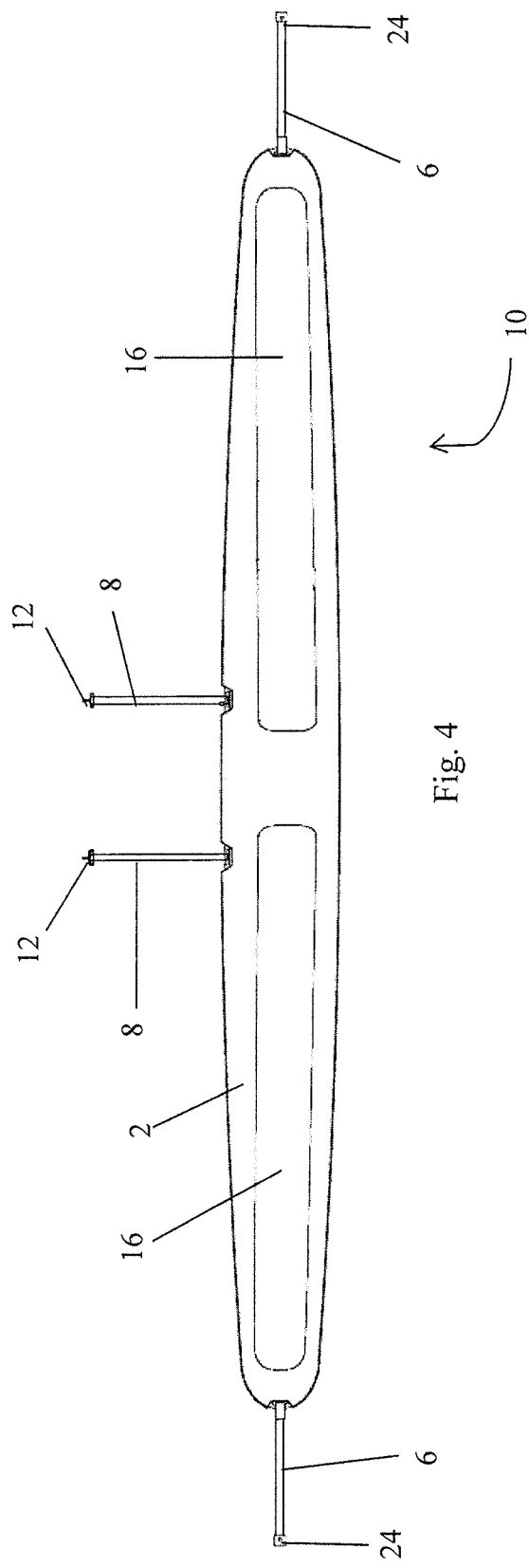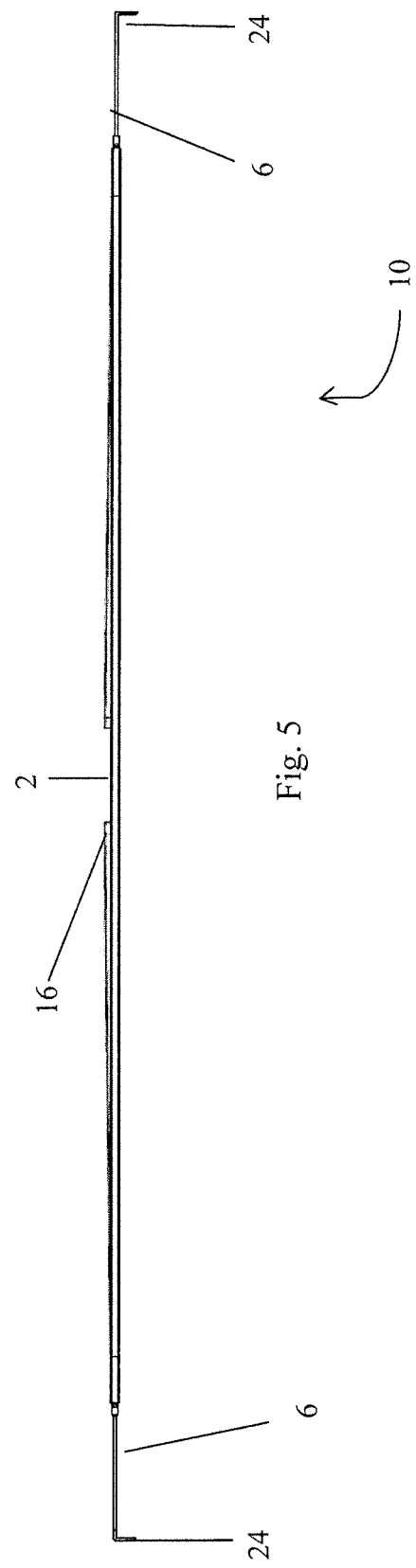

BUMPER GUARD

TECHNICAL FIELD

This disclosure relates to a guard for protecting a motor vehicle's rear and/or front bumper from damage.

BACKGROUND

Vehicles parked in public places are exposed to the risk of coming into contact with other vehicles being parked in adjacent parking spots. Even at a low speed, a collision between the bumpers of two vehicles can result in damage to the paint finish or dents in the bumper. Damage of this nature can be unsightly and costly to repair.

Accordingly, there is a need for a device that can protect a bumper from damage resulting from a low speed collision.

SUMMARY

I provide a bumper guard assembly for a vehicle comprising a flexible elongated body, a rigid terminal brace positioned on each opposing end of the elongated body, and a fender strap mounted on each terminal brace for securing the bumper guard to a fender of the vehicle.

BRIEF DESCRIPTION OF THE DRAWINGS

FIG. 4 is a top view of the exemplary bumper guard assembly depicted in FIG. 1.

FIG. 5 is a side view of the exemplary bumper guard assembly depicted in FIG. 1.

DETAILED DESCRIPTION

Figure 1:
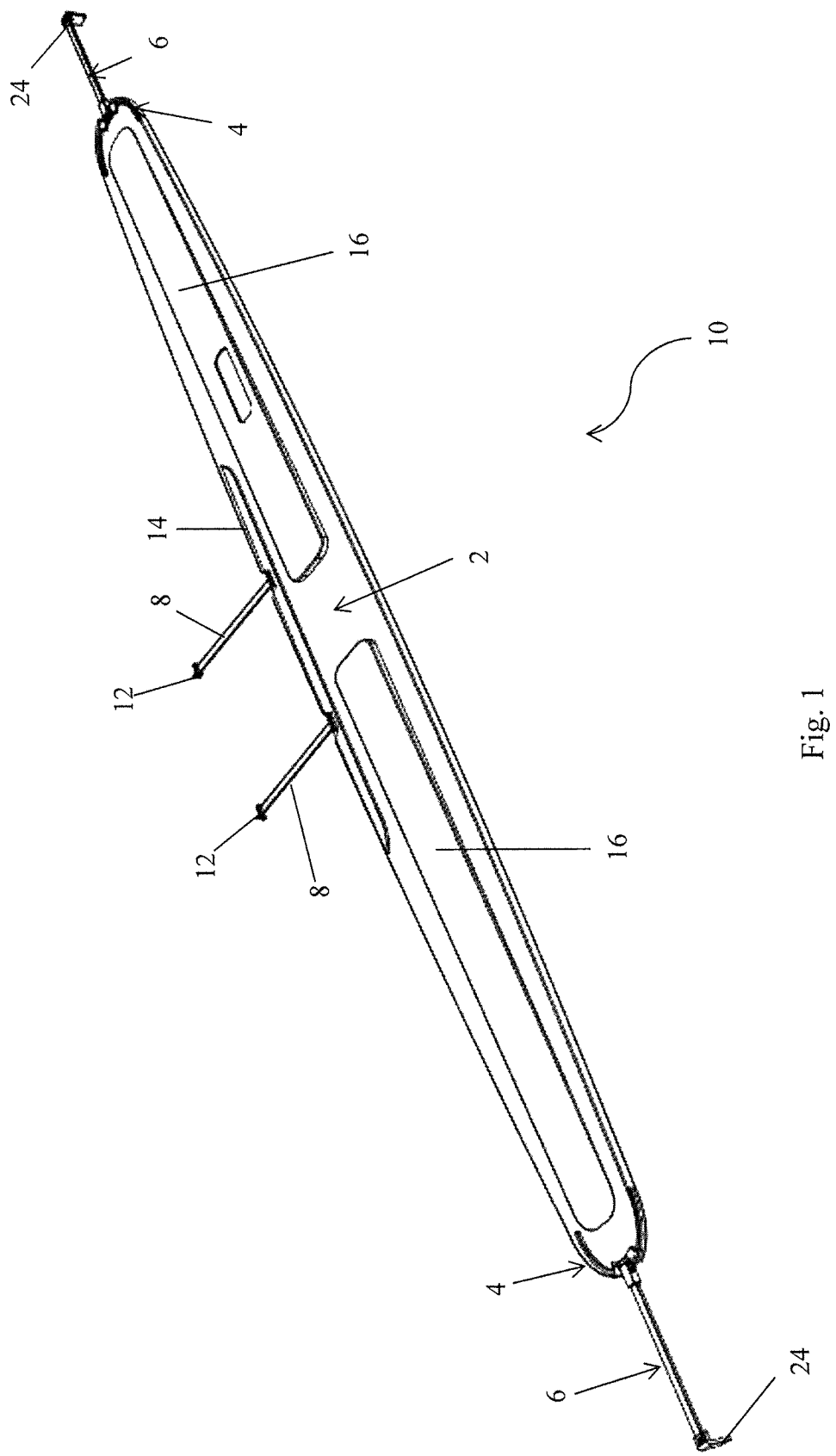
FIG. 1 is a perspective view of an exemplary bumper guard assembly.

It will be appreciated that the following description is intended to refer to specific examples of structure selected for illustration in the drawings and is not intended to define or limit the disclosure, other than in the appended claims.

The present disclosure relates to a bumper guard assembly configured to protect a vehicle from dents, scratches, dings and marks caused by collision or contact to the vehicle's bumper. A bumper guard assembly of this disclosure can be mounted on either or both a front or rear bumper.

Figure 2:
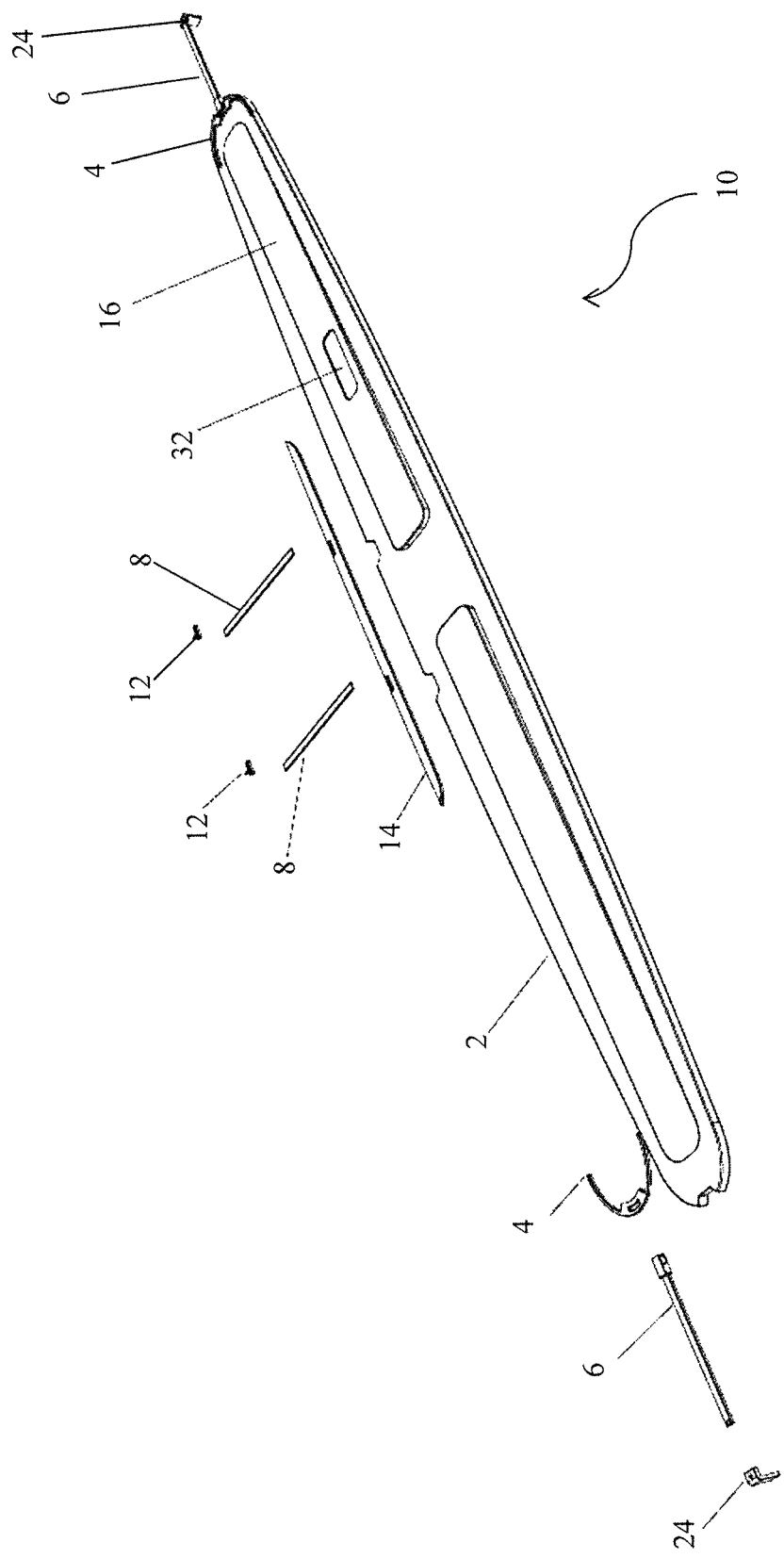
FIG. 2 is an exploded view of the exemplary bumper guard assembly depicted in FIG. 1.

An exemplary bumper guard assembly is depicted in FIGS. 1 and 2. The bumper guard assembly 10 shown in FIG. 1 comprises a flexible elongated body 2, a pair of terminal braces 4 positioned on each opposing end of the elongated body 2, and a fender strap 6 mounted on each terminal brace 4 for securing the bumper guard assembly 10 to a fender of the vehicle.

In preferred examples, the flexible elongated body 2 has a height configured to cover at least a portion of a vertical surface of a front or rear vehicle bumper. The flexible elongated body 2 may have a length configured to cover at least a portion of the length of the rear or front facing portion of a vehicle bumper and, more preferably, has a length greater than that of the vehicle bumper. In such an example, the bumper guard assembly 10 is able to conform to the contours of a bumper and wrap around the corners of the bumper to cover the sides and rear or front facing portion of a vehicle bumper.

The flexible elongated body 2 may be formed from any suitable flexible material. Preferably, the material is configured to absorb at least a portion of the force of impact between two vehicles at low speed. In preferred examples, the flexible elongated body 2 comprises an elastomeric material, such as but not limited to silicone or rubber. Silicone is a particularly suitable material because it is resistant to weather, UV rays, heat, moisture, and corrosive chemicals, and is able to withstand harsh processing environments and challenging operating conditions.

Additionally, the flexible elongated body 2 may be a transparent material or be provided in any desirable color. A transparent material provides a particularly aesthetically pleasing bumper guard 10, may be used with a vehicle of any color and allows the headlights, taillight and/or reflectors within the bumper to remain visible through the bumper guard assembly 10.

The length, height and thickness dimensions of the flexible elongated body 2 are not limited. Suitable vertical height dimensions of the flexible elongated body 2 may range from 5 to 8 inches, but other dimensions are possible.

As shown in FIG. 1, each of the left and right opposing ends of the elongated body 2 is equipped with a terminal brace 4. The terminal braces 4 are formed from a rigid material, such as but not limited to a metal or hard plastic. The terminal braces 4 assist in maintaining the vertical shape of the flexible elongated body 2 and provide a structure for mounting a fender strap 6 on the bumper guard assembly 10. The terminal braces 4 may be mounted onto the flexible elongated body 2 or integrated into the bumper guard assembly 10 by overmolding the terminal braces 4 with the material comprising the flexible elongated body 2.

Additionally, the bumper guard assembly 10 may further comprise at least one central strap 8 for fastening the central portion of the bumper guard assembly 10 to the vehicle and preventing downward sagging. As shown, a central strap 8 may be mounted on the central portion of the bumper guard assembly 10. If, as shown in FIG. 1, a plurality of central straps 8 is provided, the central straps 8 may suitably be positioned at equal distances from the center-point of the flexible elongated body 2. Preferably, the central straps 8 may be formed from a steel-belted fabric material. The central strap 8 may optionally be provided with the hook portion of a hook and loop-type fastener (e.g., VELCRO®).

The central straps 8 are configured to extend from the flexible elongated body 2 into the interior of the trunk space or engine compartment of the vehicle. In some examples, a central strap 8 is optionally fitted with a distally positioned fastener 12 configured to secure the central strap 8 to an interior material of the trunk space or engine compartment of the vehicle. In some examples, the fastener 12 may be a rigid hook that secures to a fabric material on the interior of the vehicle's trunk or an existing structural feature of the engine compartment. In alternative examples, the fastener 12 may be provided with the hook portion of a hook and loop fastener (e.g., VELCRO®) that engages with a fabric material on the interior of the vehicle's trunk. Additionally, the central strap 8 may simply be secured by a friction fit between the hood or trunk and body of the vehicle.

As shown, the bumper guard assembly 10 may further comprise a horizontal support member 14. The horizontal support member 14 may assist in maintaining the horizontal shape of the flexible elongated body 2 and provide a structure for mounting the central straps 8 on the bumper guard assembly 10. The horizontal support member 14 is preferably a rigid material, such as metal, hard plastic and the like. The horizontal support member 14 may be mounted onto the flexible elongated body 2 or may be overmolded with the material comprising the flexible elongated body 2.

The structure of the terminal brace 4 and fender strap 6 will now be discussed in greater detail with reference to FIG. 3. As shown, the terminal braces 4 are crescent-shaped. This crescent-shape is preferred because it provides vertical support for the opposing ends of the flexible elongated body 2. However, other configurations are possible, such as semi-circular, square, rectangular, polygonal or the like.

Figure 3:
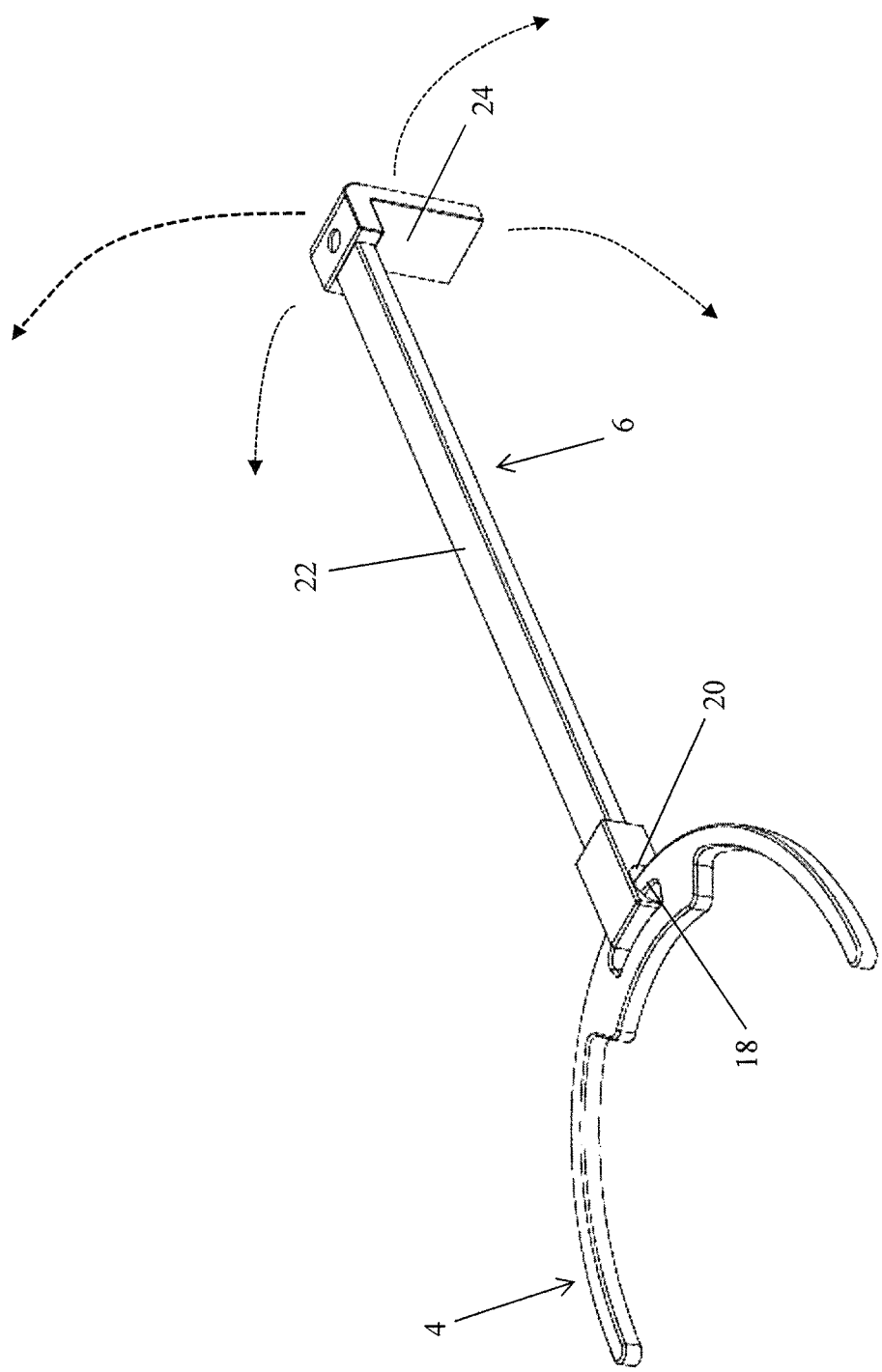
FIG. 3 is a perspective view of a terminal brace from the exemplary bumper guard assembly depicted in FIG. 1.

As shown by the arrows in FIG. 3, a fender strap 6 is preferably pivotably mounted to the terminal brace 4 to allow for a pivoting motion of the fender strap 6 with respect to the terminal brace 4 in both the vertical and horizontal directions. The pivotable engagement of the fender strap 6 allows for a user to adjust the angle of the fender strap 6 as needed to accommodate the particular fender structure of his or her vehicle. An exemplary pivotable mount can be provided by the engagement of a pin 18 of the terminal brace 4 with an eye 20 of the fender strap 6.

The fender strap 6 preferably comprises an elongated strap portion 22. Preferably, the elongated strap portion 22 is formed from a resilient or elastic material. The elongated strap portion 22 may be configured to apply tension when the bumper guard assembly 10 is mounted on a vehicle for a secure and snug fit.

A fender attachment member 24 may be distally mounted on the elongated strap portion 22 for securing the bumper guard assembly 10 to a fender of the vehicle. As shown, the fender attachment member 24 is L-shaped, although other configurations are possible.

As best seen by comparison of FIGS. 4 and 5, the exemplary bumper guard assembly 10 may further include at least one impact zone 16. An impact zone is a region of the flexible elongated body 2 configured to absorb greater amount of the force of an impact. As shown in FIGS. 4 and 5, the impact zones 16 comprise regions having a greater thickness of material relative to other regions of the flexible elongated body 2. The flexible elongated body 2 in regions comprising an impact zone 16 may have a uniform or variable thickness.

Figure 6:
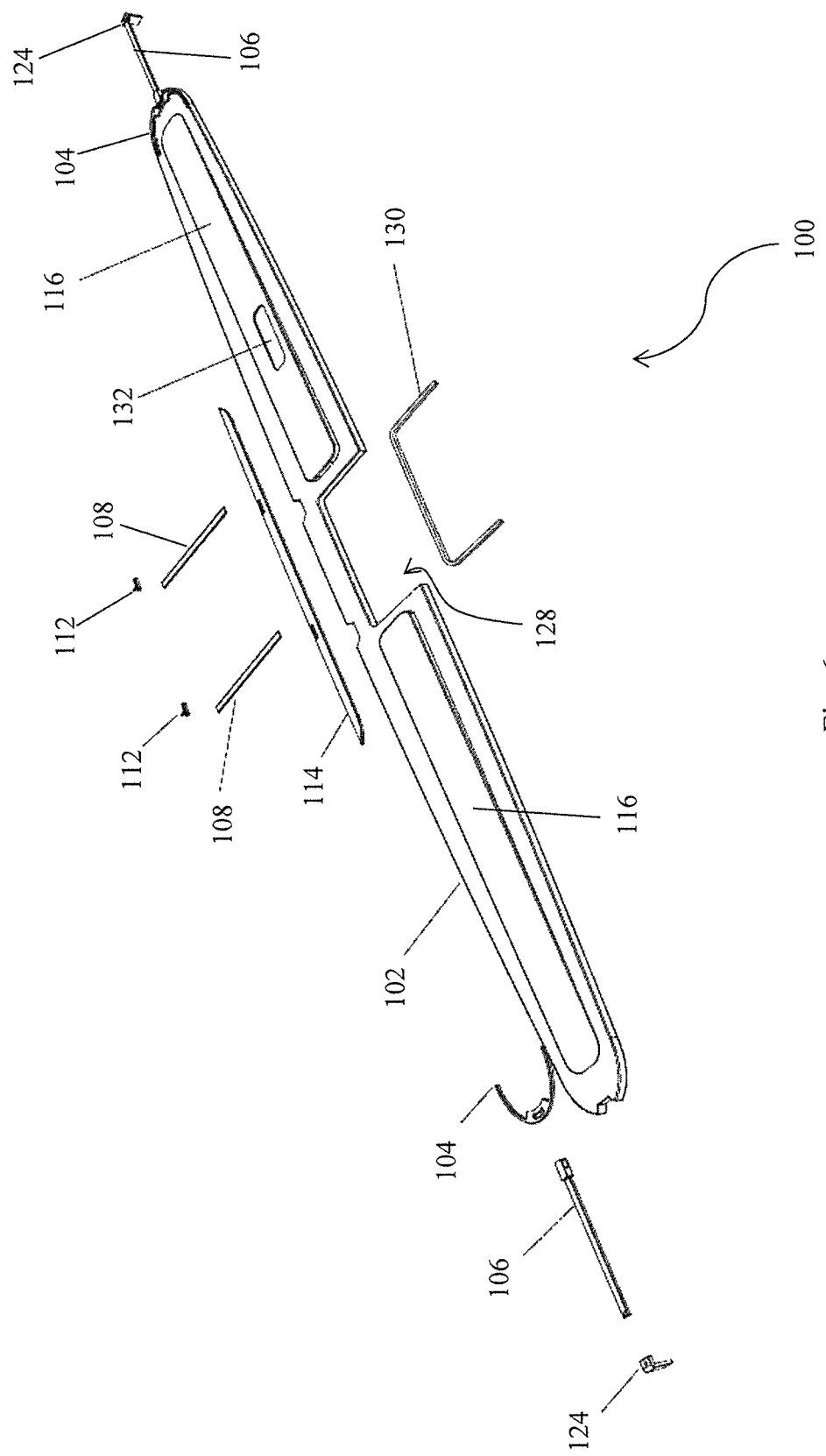
FIG. 6 is an exploded view of an alternate exemplary bumper guard assembly for a rear bumper.
Figure 7:
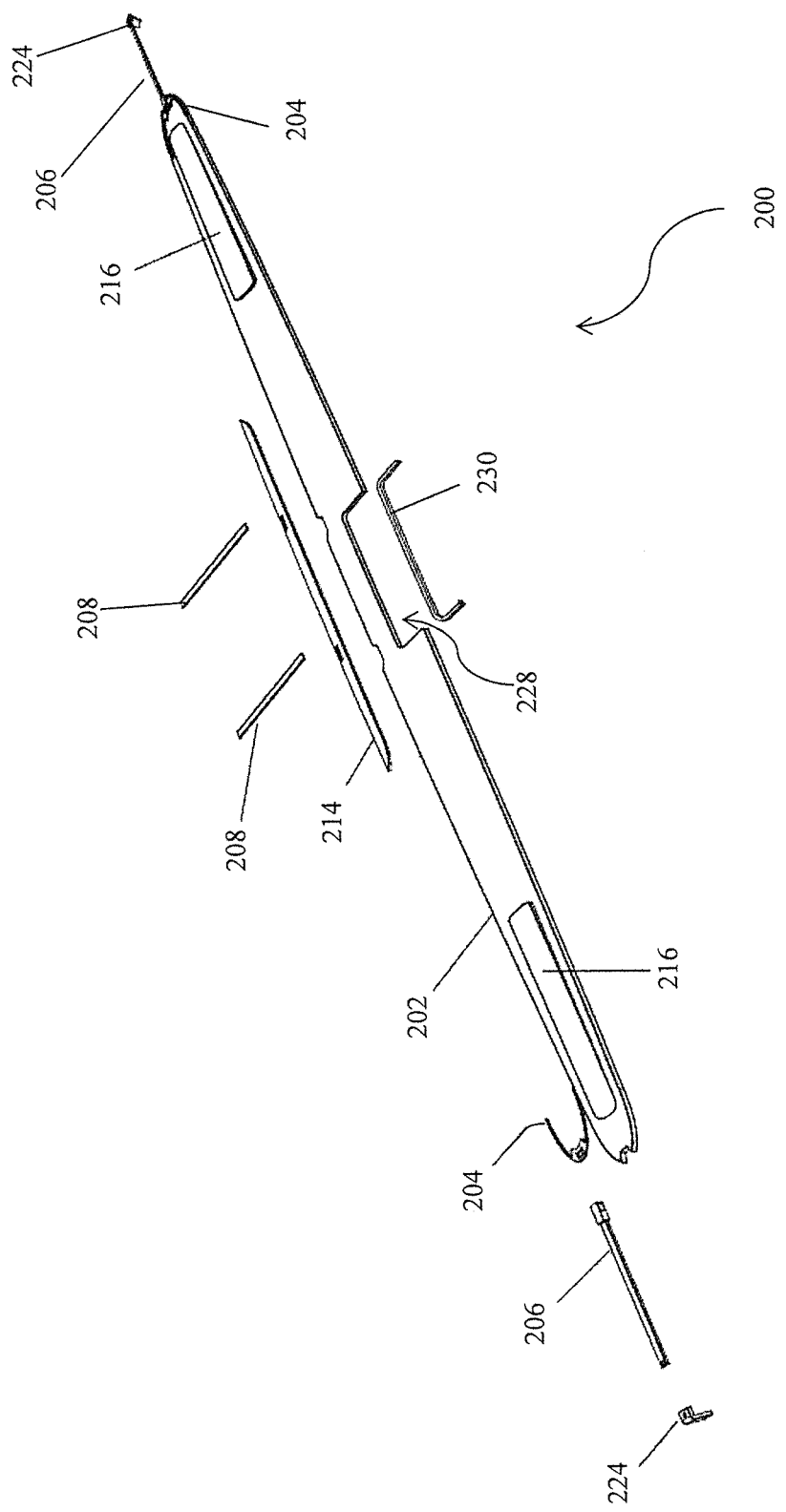
FIG. 7 is an exploded view of yet another alternate exemplary bumper guard assembly for a front bumper.

FIGS. 6 and 7 depict exemplary bumper guard assemblies 100 and 200 configured to have dimensions customized to correspond to either a rear bumper (FIG. 6) or front bumper (FIG. 7). For example, a bumper guard assembly 200 for a front bumper may have a different length, height, or thickness than a bumper guard assembly 100 for a rear bumper. One skilled in the art would readily be able to select appropriate dimensions to fit a broad range of vehicle front and/or rear bumpers or to customize a bumper guard assembly for a particular vehicle type.

Additionally, FIG. 6 depicts the optional feature of a license plate window 126 in a central portion of the bumper guard assembly 100. The license plate window 126 allows a license plate mounted on the vehicle bumper to be visible even when the bumper guard assembly 100 is mounted on the vehicle. As shown, the license plate window 128 may be a rectangular cut-out in the flexible elongated body 102. Additionally, for support and reinforcement, the license plate window 128 may further comprise a rigid support bracket 130 fixed to the edges of the cut-out 128.

In some examples, a logo reflector 32, 132 on the bumper guard may be provided for an added measure of visibility for other drivers. Additional optional features may be added without departing from the concepts provided in this disclosure.

Although the apparatus and methods have been described in connection with specific forms thereof, it will be appreciated that a wide variety of equivalents may be substituted for the specified elements described herein without departing from the spirit and scope of this disclosure as described in the appended claims.

What is claimed is:

1. A bumper guard assembly for a vehicle comprising:
  a) a flexible elongated body,
  b) a rigid terminal brace formed from a rigid material and positioned on each opposing end of the elongated body, and
  c) a fender strap mounted on each terminal brace for securing the bumper guard to a fender of the vehicle, wherein the rigid terminal braces are crescent-shaped.

2. The bumper guard assembly of claim 1, wherein each fender strap is pivotably mounted on each terminal brace by engagement of a pin of the rigid terminal brace with an eye of the fender strap.

3. The bumper guard assembly of claim 1, wherein the flexible elongated body comprises an elastomeric material.

4. The bumper guard assembly of claim 1, wherein the flexible elongated body comprises silicone or rubber.

5. The bumper guard assembly of claim 1, wherein the flexible elongated body is a transparent material.

6. The bumper guard assembly of claim 1, wherein the rigid terminal braces are overmolded by a material of the flexible elongated body.

7. The bumper guard assembly of claim 1, wherein each of the fender straps comprises a distally mounted attachment member for securing the bumper guard to a fender of the vehicle.

8. The bumper guard assembly of claim 1, further comprising at least one central strap mounted on a central portion of the bumper guard assembly.

9. The bumper guard assembly of claim 8, wherein the central strap comprises a distal fastener that is a hook.

10. The bumper guard assembly of claim 8, wherein the central strap comprises a distal fastener that comprises a hook portion of a hook and loop fastener.

11. The bumper guard assembly of claim 1, wherein the flexible elongated body comprises at least one impact zone.

12. The bumper guard assembly of claim 11, wherein the impact zone comprises a region of the flexible elongated body having a greater thickness than a region of the flexible elongated body not comprising an impact zone.

13. The bumper guard assembly of claim 1, wherein the bumper guard assembly comprises a license plate window through which a license plate mounted on the vehicle is visible.

14. The bumper guard assembly of claim 13, wherein the license plate window is a cut-out in the flexible elongated body.

15. The bumper guard assembly of claim 13, wherein the license plate window comprises a support bracket.

16. The bumper guard assembly of claim 1, further comprising a horizontal support member.

17. A bumper guard assembly for a vehicle comprising:
  a) a flexible elongated body formed from silicone or rubber,
  b) a crescent-shaped, rigid terminal brace positioned on each opposing end of the elongated body, c) a fender strap pivotably mounted on each terminal brace for securing the bumper guard to a fender of the vehicle; and
d) at least one central strap with a distal fastener mounted on a central portion of the bumper guard assembly.

18. A bumper guard assembly for a vehicle comprising:
a) a flexible elongated body,
b) a rigid terminal brace formed from a rigid material and positioned on each opposing end of the elongated body, and
c) a fender strap mounted on each terminal brace for securing the bumper guard to a fender of the vehicle, wherein the flexible elongated body is a transparent material.

* * * * *